US009536240B2

(12) United States Patent
Raja et al.

(10) Patent No.: US 9,536,240 B2
(45) Date of Patent: Jan. 3, 2017

(54) SECURE CARDLESS CASH WITHDRAWAL

(71) Applicant: PAYPAL, INC., San Jose, CA (US)

(72) Inventors: Balaji Raja, San Jose, CA (US); Aditya Jain, San Jose, CA (US); Teddy Vincent Toms, Los Altos, CA (US); Kiran Kumar Sridhar, Milpitas, CA (US)

(73) Assignee: PayPal, Inc., San Jose, CA (US)

( * ) Notice: Subject to any disclaimer, the term of this patent is extended or adjusted under 35 U.S.C. 154(b) by 0 days.

(21) Appl. No.: 14/336,590

(22) Filed: Jul. 21, 2014

(65) Prior Publication Data

US 2016/0019537 A1   Jan. 21, 2016

(51) Int. Cl.
G06Q 20/00 (2012.01)
G06Q 20/38 (2012.01)
G07F 19/00 (2006.01)
G06Q 20/32 (2012.01)

(52) U.S. Cl.
CPC ........ G06Q 20/385 (2013.01); G06Q 20/3224 (2013.01); G07F 19/203 (2013.01)

(58) Field of Classification Search
CPC ........ G06Q 20/32; G06Q 20/40; G06Q 20/18; G06Q 20/1085; G06Q 20/3223; G07F 19/20; G07F 19/203
See application file for complete search history.

(56) References Cited

U.S. PATENT DOCUMENTS

| 6,505,165 B1 | 1/2003 | Berstis et al. |
| 6,796,490 B1 * | 9/2004 | Drummond ............ G06Q 20/32 235/379 |
| 7,591,413 B1 * | 9/2009 | Block .................. G07F 19/207 235/379 |

(Continued)

FOREIGN PATENT DOCUMENTS

WO   WO 2009/009852 A2   1/2009

OTHER PUBLICATIONS

United States Patent Office, Notification of Transmittal of the International Search Report and the Written Opinion of the International Searching Authority, Search Report for PCT/US14/36978, Mailing date of Sep. 19, 2014, 9 pages.

(Continued)

*Primary Examiner* — Christopher Stanford
(74) *Attorney, Agent, or Firm* — Haynes & Boone, LLP

(57) ABSTRACT

Methods, systems, and computer program products for secure cardless cash withdrawal are provided. A computer-implemented method may include identifying one or more cash machines near a computing device of a user, receiving a cash request from the computing device, generating a one-time authorization code on a secure server for the cash request when the computing device is detected by a sensor of a selected cash machine, providing the one-time authorization code to the computing device for display to the user when the computing device is detected within a distance allowing the user to operate the cash machine, validating a user-provided code received from the selected cash machine (Continued)

in view of the one-time authorization code, instructing the selected cash machine to distribute the requested cash when the user-provided code is validated, and invalidating the one-time authorization code when the cash request is completed.

20 Claims, 5 Drawing Sheets

(56) References Cited

U.S. PATENT DOCUMENTS

| | | | |
|---|---|---|---|
| 7,716,133 B1 * | 5/2010 | Foote et al. | 705/43 |
| 8,616,984 B2 | 12/2013 | Mattice et al. | |
| 2001/0051922 A1 * | 12/2001 | Waller et al. | 705/43 |
| 2006/0191996 A1 * | 8/2006 | Drummond et al. | 235/379 |
| 2006/0206709 A1 * | 9/2006 | Labrou et al. | 713/167 |
| 2008/0109375 A1 * | 5/2008 | Ricci et al. | 705/76 |
| 2008/0172340 A1 * | 7/2008 | Karlsson | 705/75 |
| 2009/0212104 A1 * | 8/2009 | Smith | G06Q 20/042 235/379 |
| 2010/0145861 A1 | 6/2010 | Law et al. | |
| 2011/0055084 A1 * | 3/2011 | Singh | 705/43 |
| 2011/0213671 A1 * | 9/2011 | Hirson et al. | 705/16 |
| 2011/0282785 A1 | 11/2011 | Chin | |
| 2012/0226983 A1 | 9/2012 | Goldenberg et al. | |
| 2012/0254808 A1 | 10/2012 | Gildfind | |
| 2013/0238497 A1 * | 9/2013 | Ramachandran et al. | 705/41 |
| 2014/0006183 A1 * | 1/2014 | Grigg | G06Q 20/20 705/16 |
| 2014/0201075 A1 | 7/2014 | King et al. | |
| 2014/0263618 A1 * | 9/2014 | McCarthy et al. | 235/379 |

OTHER PUBLICATIONS

United States Patent Office, Notification of Transmittal of the International Search Report and the Written Opinion of the International Searching Authority, Search Report for PCT/US2015/023425, Mailing date of Jul. 6, 2015, 11 pages.

* cited by examiner

SECURE CARDLESS CASH WITHDRAWAL

TECHNICAL FIELD

The present invention generally relates to financial services and, more particularly, to secure cash withdrawal without the use of a card.

BACKGROUND

A cash machine generally refers to an electronic computing device that allows users of a financial institution to perform financial transactions (e.g., cash deposits, withdrawals) without assistance of another person. In most modern cash machines, a user is identified by an inserted plastic card with a magnetic strip, or a plastic smart card with a unique card number and security information. Authentication is usually provided with a reusable personal identification number (PIN) associated with a user's financial account.

In recent years, new high-tech methods of fraud have been used to steal card information from users. For example, in "card skimming" criminals install a magnetic card reader over a cash machine card slot and use a wireless surveillance camera, modified digital camera, or false PIN keypad to capture a user's PIN. Criminals then create a cloned card using the stolen data and use captured PIN information to carry out fraudulent cash withdrawals.

Further, in many situations a merchant may not provide a cash machine, a merchant may only accept cash payments, a cash machine may be broken or without sufficient cash, a user may not trust that an available cash machine is secure, or a user may not have access to a card left in a forgotten a purse or wallet.

Accordingly, improved methods of authentication can aid in the prevention of fraudulent activity and provide greater convenience to users of cash machines.

BRIEF DESCRIPTION OF THE DRAWINGS

Various examples of the present disclosure will be understood more fully from the detailed description given below and from the accompanying drawings of various examples of the disclosure. In the drawings, like reference numbers may indicate identical or functionally similar elements. The drawing in which an element first appears is generally indicated by the left-most digit in the corresponding reference number.

DETAILED DESCRIPTION

Systems, methods, and computer program products for providing secure cardless cash withdrawal are disclosed.

Examples of the present disclosure allow a user to withdraw cash from a financial account at a cash machine without use of a card, thus providing improved security and convenience.

In an example, an application running on a client device provides a user with information about one or more available cash machines located near the user. The application then allows the user to select one of the identified cash machines when initiating a cash request. In some examples, a sensor associated with the selected cash machine detects the presence of the client device, and the application on the client device prompts the user to approach the cash machine.

In an example, a one-time authorization code is generated for the cash request and provided to the client device when the user is in front of the cash machine. The cash machine automatically prompts the user to enter the one-time authorization code sent to the client device and accepts a code input or displayed by the user. The cash machine distributes the requested cash and completes the transaction when the user-provided code matches the one-time authorization code. The one-time authorization code is invalidated once the cash request is complete.

Accordingly, aspects of the present disclosure allow a user to withdraw cash from a financial account at a cash machine without a card by using a computing device and a one-time authorization code provided to the computing device. Such methods improve security because criminals do not have a card to steal and a one-time authorization code may not be used for another transaction. Further, convenience is improved by allowing a user to withdraw cash with a mobile phone or other device when a card is unavailable or when the user prefers not to carry a card.

Figure 1:
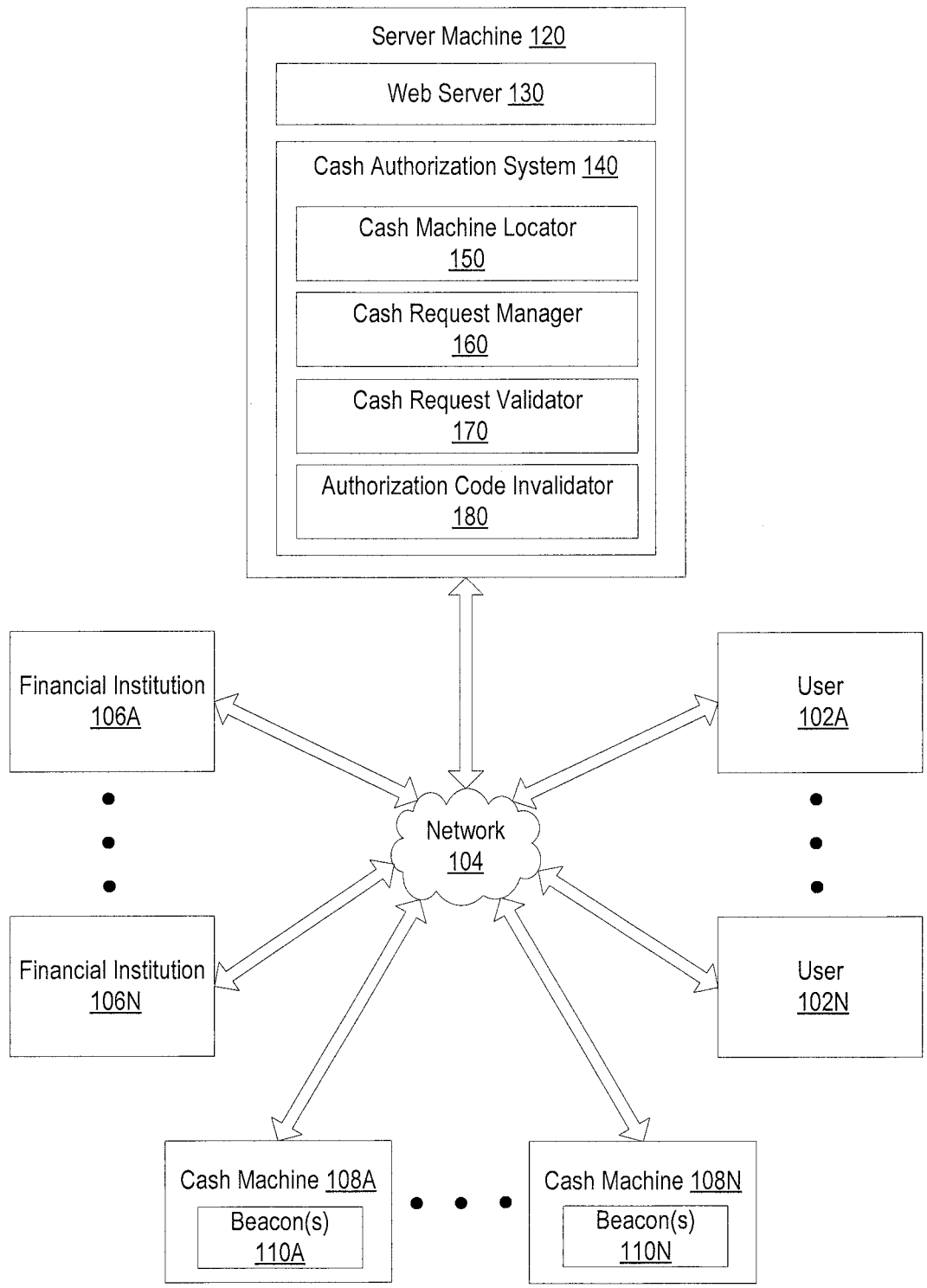
FIG. 1 is a block diagram illustrating a system architecture, in accordance with various examples of the present disclosure.

FIG. 1 illustrates an exemplary system architecture 100 in which examples of the present disclosure can be implemented. System architecture 100 includes users 102A-102N (e.g., user machines), financial institutions 106A-106N, cash machines 108A-108N, and server machine 120 connected to a network 104. Network 104 may be a public network (e.g., the Internet), a private network (e.g., a local area network (LAN) or wide area network (WAN)), or a combination thereof.

In an example, network 104 may include the Internet and/or one or more intranets, landline networks, wireless networks, and/or other appropriate types of communication networks. In one example, the network 104 may comprise a wireless telecommunications network (e.g., cellular phone network) adapted to communicate with other communication networks, such as the Internet.

User 102A-102N machines may be computing devices, such as personal computers (PC), laptops, mobile phones, smart phones, smart televisions, tablet computers, or any other type of computing device. User 102A-102N machines may run an operating system (OS) that manages hardware and software of a respective machine. A browser (not shown) may run on user 102A-102N machines (e.g., on the OS of a user 102A machine). The browser may be a web browser that can access content and services provided by a web server 130 of server machine 120. Further, other types of software applications running on user 102A-102N machines may provide access to content and services of server machine 120 without use of a web server 130 or browser.

Server machine 120 may be a rackmount server, a router computer, a personal computer, a portable digital assistant, a mobile phone, a laptop computer, a tablet computer, a camera, a video camera, a netbook, a desktop computer, a media center, or any combination thereof. Server machine 120 may include a web server 130 and a cash authorization system 140. In some examples, web server 130 and cash authorization system 140 may run on one or more different machines. In one example, cash authorization system 140 allows a user 102A to withdraw cash from a financial institution 106A account at cash machine 108A using a computing device instead of a card (e.g., bank card, debit card, cash card, credit card, client card, payment card, electronic benefit transfer cards, etc.).

Web server 130 may serve text, audio, video and image content to users 102A-102N. Web server 130 also may provide web-based application services and business logic to users 102A-102N. Users 102A-102N may locate, access and consume various forms of content and services from web server 130 using applications, such as a web browser. Web server 130 also may receive text, audio, video and image content from users 102A-102N that is persisted in a data store for purposes that may include preservation and future retrieval.

In an example, web server 130 is coupled to one or more applications servers (not shown) that provide applications and services to users 102A-102N. In one example, application servers may provide users 102A-102N with access to one or more software applications, including but not limited to finance, banking, investing, payment processing, cash withdrawals, and electronic commerce. Such functionality also may be provided, for example, using one or more different web applications, standalone applications, systems, plug-ins, web browser extensions, and application programming interfaces (APIs).

In an example, some user 102A-102N machines may include applications associated with a service provided by server machine 120 (e.g., applications, mobile applications, "apps"). In one example, one or more device types (e.g., smart phones, smart televisions, tablet computers, etc.) may use applications to access content provided by server machine 120, to issue commands to server machine 120, or to receive content from server machine 120 without accessing or using web pages.

In an example, functions performed by server machine 120 and/or web server 130 also may be performed by the client 102A-102N machines, in whole or in part. In addition, the functionality attributed to a particular component may be performed by different or multiple components operating together. Server machine 120 also may be accessed as a service provided to other systems or devices via appropriate application programming interfaces, and thus is not limited to use in websites.

In an example, cash authorization system 140 includes cash machine locator 150, cash request manager 160, cash request validator 170, and authorization code invalidator 180. In other examples, functionality associated with cash machine locator 150, cash request manager 160, cash request validator 170, and authorization code invalidator 180 may be combined, divided and organized in various arrangements.

In an example, cash machine locator 150 receives a request to provide information about cash machines 108A-108N located near a user 102A machine. For example, a user 102A may request a list of cash machines 108A-108N located within a distance of a location provided by a user 102A machine. In response, cash machine locator 150 may identify one or more cash machines 108A-108N within the distance of the provided location.

In an example, cash machine locator 150 filters identified cash machines 108A-108N based on one or more user preferences prior to returning a result to a user 102A. For example, cash machine locator 150 may filter identified cash machines 108A-108N based on one or more financial institutions 106A-106N preferred by or associated with a user 102A. Cash machine locator 150 also may filter identified cash machines 108A-108N based on cash machine service fees, available cash machine currency, cash machine merchant affiliation, cash machines supporting cardless cash withdrawal, etc.

In an example, cash machine locator 150 provides a filtered or unfiltered list of identified cash machines 108A-108N to a user 102A. For example, one or more identified cash machines 108A-108N may be presented to a user 102A in a list of information, on a map, or in other arrangements. In one example, cash machine locator 150 provides a location and other information about a cash machine 108A nearest to a user 102A as compared to other identified cash machines 108A-108N. In another example, cash machine locator 150 provides a visual indicator (e.g., color, icon, image, etc.) or textual indicator (e.g., label, code, etc.) to show that an identified cash machine 108A supports cardless cash transactions (e.g., cardless cash withdrawals, cardless deposits, etc.).

A cash machine 108A generally refers to an automated, semi-automated, or manually operated terminal where a user 102A may withdraw or extract cash or other physical currency (e.g., gold, silver, etc.) from a financial institution 106A account. A cash machine 108A may include or be referred to as an automated teller machine, an automated banking machine, cashpoint, cashline, etc. A cash machine also may include a point of sale system where a user may access or withdraw available cash from an account. For example, a grocery store checkout, bank teller terminal, or money transfer location also may serve as a cash machine 108A where a user can perform secure cardless cash withdrawal.

Cash machines 108A-108N may be associated with one or more beacons 110A-110N or other types of secure sensors. A beacon generally refers to a short-range communication device having a known or fixed location. A beacon usually provides a signal that can be detected by mobile devices within a certain proximity of the beacon. An example of a beacon is a radio frequency (RF) beacon (e.g., Bluetooth™ low energy (BLE) beacon), infrared beacon or a radio frequency identifier (RFID) tag. For example, a BLE beacon can broadcast an RF signal that includes its position coordinates (e.g., latitude, longitude), which can be detected by a mobile device. In some examples, a beacon also may advertise location-based services provided by a beacon network. A beacon network usually encompasses a plurality of beacons in a geographic region.

When a mobile device first makes contact with a beacon in the beacon network, the beacon can transmit to the mobile device a list of unique identifiers of other beacons in the network and other information about the beacon network. Beacon networks can be located in any geographic region including businesses (e.g., shopping malls, retail stores, restaurants, etc.), landmarks (e.g., museums, airports, parks, entertainment venues, etc.), homes and any other environments where location-based services are desired.

In an example, beacons may be placed on or near cash machines 108A-108N to detect the presence of a user 102A computing device associated with a pending cardless cash request when the computing device is in range of a cash machine 108A, to determine whether a user 102A is close enough to a cash machine 108A to enter a one-time authorization code, to determine whether a user 102A is no longer in range of a cash machine 108A, etc.

Financial institutions 106A-106N generally refer to any organizations that provide financial services to users 102A-102N. Financial institutions include, but are not limited to, banks, investment companies, insurance companies, payment service providers, merchants, pension firms, state and federal government agencies, etc. Financial institutions 106A-106N generally operate and manage financial accounts for users 102A-102N. In addition, various types of financial institution 106A-106N accounts allow a user to extract or withdraw an amount of cash that is backed by or available within an account. In an example, cash authorization system 140 allows a user 102A to securely withdraw cash from a financial institution 106A account at a cash machine 108A with a mobile computing device instead of a card.

In an example, cash request manager 160 receives a cash request from a computing device of a user 102A to be fulfilled at a user-selected cash machine 108A. In one example, cash request manager 160 generates a one-time authorization code for a cash request to allow secure distribution of the requested cash at a selected cash machine 108A. For example, cash request manager 160 may send the one-time authorization code generated for the cash request to a requesting user 102A computing device or another user's 102N computing device as specified by a requesting user 102A. In one example, a one-time authorization code may be generated and sent to a mobile phone application running on a computing device in response to a user 102A selecting an available cash machine 108A from a list of displayed cash machines 108A-108N presented in order based on proximity to a location of the same or another computing device. In one example, the one-time authorization code may be entered at a selected cash machine 108A to withdraw the requested cash. In some examples, a one-time authorization code may be entered at one of a plurality of cash machines 108A-108N associated with cash authorization system 140.

In an example, a one-time authorization code is valid for a specific cash request and may not be used or reused with another cash request or transaction. In one example, a one-time authorization code has a lifetime where it remains active and useable (e.g., 30 seconds, 1 minute, two minutes, etc.). The lifetime of a one-time authorization code may be extended, for example, at a request of a user or when a user is detected within range of a cash machine 108A by a beacon or other sensor associated with the cash machine.

In an example, a one-time authorization code may include a single-use, numeric personal identification number (PIN), a single-use, alphanumeric code, a single-use quick response (QR) code, etc. In one example, cash request manager 160 may provide a generated one-time authorization code to cash request validator 170 or a cash machine 108A for validation.

In an example, cash request validator 170 authorizes a cash request received from a user 102A. For example, cash request validator 170 may authorize a cash request based on one or more attributes of a user 102A financial account. In one example, cash request validator 170 sends an authorization request to a financial institution 106A associated with a financial account and receives authorization from the financial institution 106A to process the cash request.

In an example, cash request validator 170 validates a user-provided code received from a cash machine 108A. In one example, a user 102A enters a one-time authorization code provided to the user's 102A computing device at a cash machine 108A, and the cash machine 108A sends the user-provided code to cash request validator 170 for validation.

In an example, cash request validator 170 validates a user-provided code by determining that a one-time authorization code for a cash request is active and has not expired, an identity and/or location of a cash machine 108 handling a cash request corresponds to a cash machine 108 selected by a user 102A, a current location of the computing device receiving the one-time authorization code is valid, and the user-provided code matches the one-time authorization code. In one example, cash request validator 170 instructs a cash machine 180 to distribute the requested cash when the validation is successful.

In an example, authorization code invalidator 180 invalidates (e.g., deactivates or expires) a one-time authorization code generated for a cash request. In one example, authorization code invalidator 180 invalidates a one-time authorization code when a cardless cash request transaction is complete. Authorization code invalidator 180 also may invalidate a one-time authorization code when a cardless cash request transaction is canceled directly or indirectly by a user 102A. For example, a user 102A may cancel a cash request using a computing device away from a cash machine 108A or using a cash machine 108A. A cardless cash request transaction also may be canceled indirectly, for example, when a user 102A moves out of range of a beacon 110A or other sensor associated with a cash machine 108A selected for the cash request.

Figure 2:
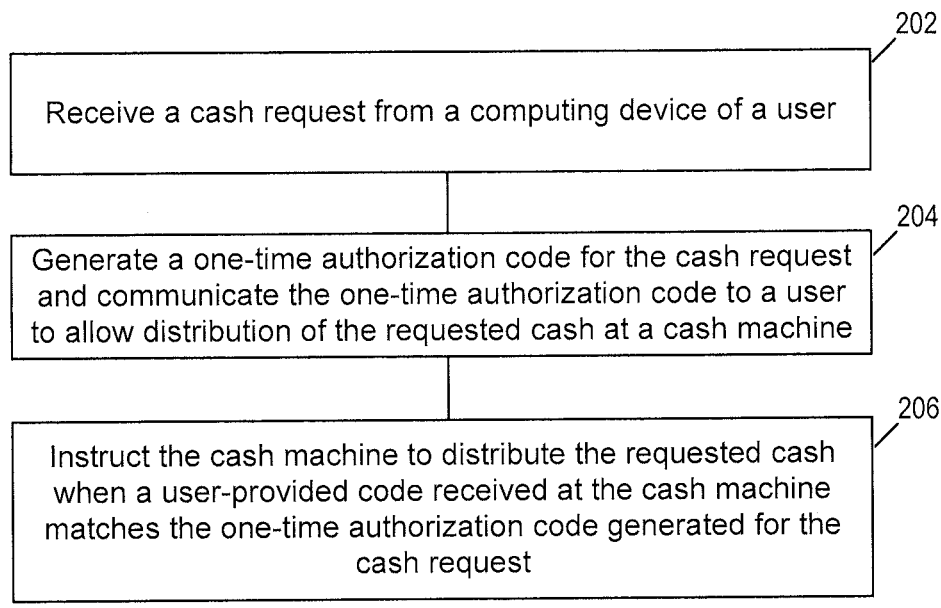
FIG. 2 is a flow diagram illustrating secure cardless cash withdrawal, according to an example of the present disclosure.

FIG. 2 is a flow diagram illustrating secure cardless cash withdrawal, according to an example of the present disclosure. The method 200 may be performed by processing logic that may comprise hardware (circuitry, dedicated logic, programmable logic, microcode, etc.), software (such as instructions run on a general purpose computer system, dedicated machine, or processing device), firmware, or a combination thereof.

Method 200 begins at block 202 when cash authorization system 140 receives a cash request from a computing device of a user 102A. In an example, a user 102A initiates a cash request using an application running on a computing device of the user. For example, a user 102A may initiate a cash request using a mobile "app" running on a mobile computing device operated by the user 102A. In one example, an application running on the computing device of the user 102A is coupled to a cash authorization system 140 via a network, and communicates with cash authorization system 140 directly or via an application programming interface (API), web services, etc. In some examples, a user 102A may initiate a cash request using a web application, text messaging, instant messaging, or using any software application(s) running on or invoked by a computing device.

In an example, a user 102A inputs or provides cash request information to a software application. For example, a user may enter cash request information into a graphical user interface (GUI) of an application or may provide textual input (e.g., one or more strings of characters) to initiate a cash request. In one example, a cash request comprises one or more of an identifier of a requesting user, a source account to fund the cash request, a financial institution associated with the source account, an identifier of a recipient user of the cash request (e.g., the same or different user), the requested amount of cash to be withdrawn from the source account, a requested currency for the cash to be provided, etc.

In an example, a user 102A initiates a cash request using an application on a computing device where the computing device is not detectable by any beacons 110A-110N associated with cash machines 108A-108N. Thus, a user 102A may initiate a cash request outside the presence or beyond range of a cash machine 108A. In some examples, a user 102A may initiate a cash request within range of a cash machine 108A, as indicated by a beacon 110A or other sensor associated with the cash machine. In an example, one or more beacons 110A or other types of sensors may be attached and/or logically linked to a cash machine 108A to provide location and/or cardless financial transactions.

In an example, a cash request initiated by a user 102A may comprise one or more of a user-selected cash machine to fulfill a cash request, a financial institution 106A account to serve as a source of funding for a cash request, an amount of cash to be supplied by a cash machine, a currency for the requested cash to be supplied, etc. In one example, a user 102A specifies another user 102N as a recipient of a cash request. For example, the user 102A may allow another individual to perform a cardless cash withdrawal using funds provided from a user 102A financial account by specifying information identifying another user (e.g., a username, userid, e-mail address, account identifier, a telephone number, etc.).

At block 204, cash authorization system 140 generates a one-time authorization code for the cash request and communicates the one-time authorization code to a user (e.g., user 102A, user 102N) to allow distribution of the requested cash at a cash machine 108A. For example, cash request manager 160 may generate a one-time authorization code for a pending cash request. In one example, a one-time authorization code is a unique, single-use code that is unusable and invalid with another transaction or request. In one example, a one-time authorization code has a lifetime (e.g., 30 seconds, 1 minute, etc.), which may be extended. One-time authorization code types may include a single-use, numeric personal identification number (PIN), a single-use, alphanumeric code, a single-use quick response (QR) code, etc.

In an example, cash request manager 160 associates a generated one-time authorization code with a cash request to allow secure, cardless fulfillment at a cash machine 108A. In one example, cash request manager 160 may associate a generated one-time authorization code with one or more cash machines 108A-108N, one of which may fulfill the cash request of a user 102A. For example, cash request manager 160 may associate a generated one-time authorization code with a specific cash machine 108A selected by a user 102A or with one or more cash machines within a distance of a location provided by the computing device of a user 102A, thus allowing a user to use one of many potential cash machines (e.g., when running errands, when shopping, etc.).

In an example, cash request manager 160 generates a one-time authorization code for the cash request when a computing device of a user 102A involved in a cash request is in range of a cash machine 108A as indicated by a beacon 110A. In one example, cash request manager 160 provides a one-time authorization code to the computing device of a user 102A involved in a cash request when the computing device is detected within twelve inches of the cash machine 108A (or closer) as indicated by a beacon 110A. In one example, cash request manager 160 may provide the one-time authorization code to the computing device of another user 102N associated with a pending cash request (e.g., via an application, text message, etc.). In some examples, cash request manager 160 also provides the one-time authorization code to one or more cash machines 108A-108N to allow distribution of the requested cash at a cash machine 108A, for example, using cash machine-provided validation.

In an example, cash request manager 160 generates a one-time authorization code for the cash request and provides the one-time authorization code to the computing device of a user 102A without the use of a beacon 110A or other sensor. For example, a user may initiate a cardless cash withdrawal using one or more screens or functions provided by a cash machine 108A. In one example, a one-time authorization code for a cash-request is generated and provided to a computing device of a user 102A (e.g., via an application) in response to a cardless cash withdrawal or other request initiated by a user 102A operating a cash machine 108A.

At block 206, cash authorization system 140 instructs the cash machine 108A to distribute the requested cash when a user-provided code received at the cash machine 108A matches the one-time authorization code generated for the cash request. In an example, a cash machine 108A receives a code for a pending cash request input by a user at the cash machine 108A. A cash machine 108A then sends the user-provided code to cash request validator 170 for validation.

In an example, cash request validator 170 compares the user-provided code to the one-time authorization code generated for the cash request. In one example, cash request validator 170 instructs or authorizes the cash machine 108A providing the user-provided code to distribute the requested cash when the user-provided code matches the one-time authorization code generated for the cash request.

Figure 3:
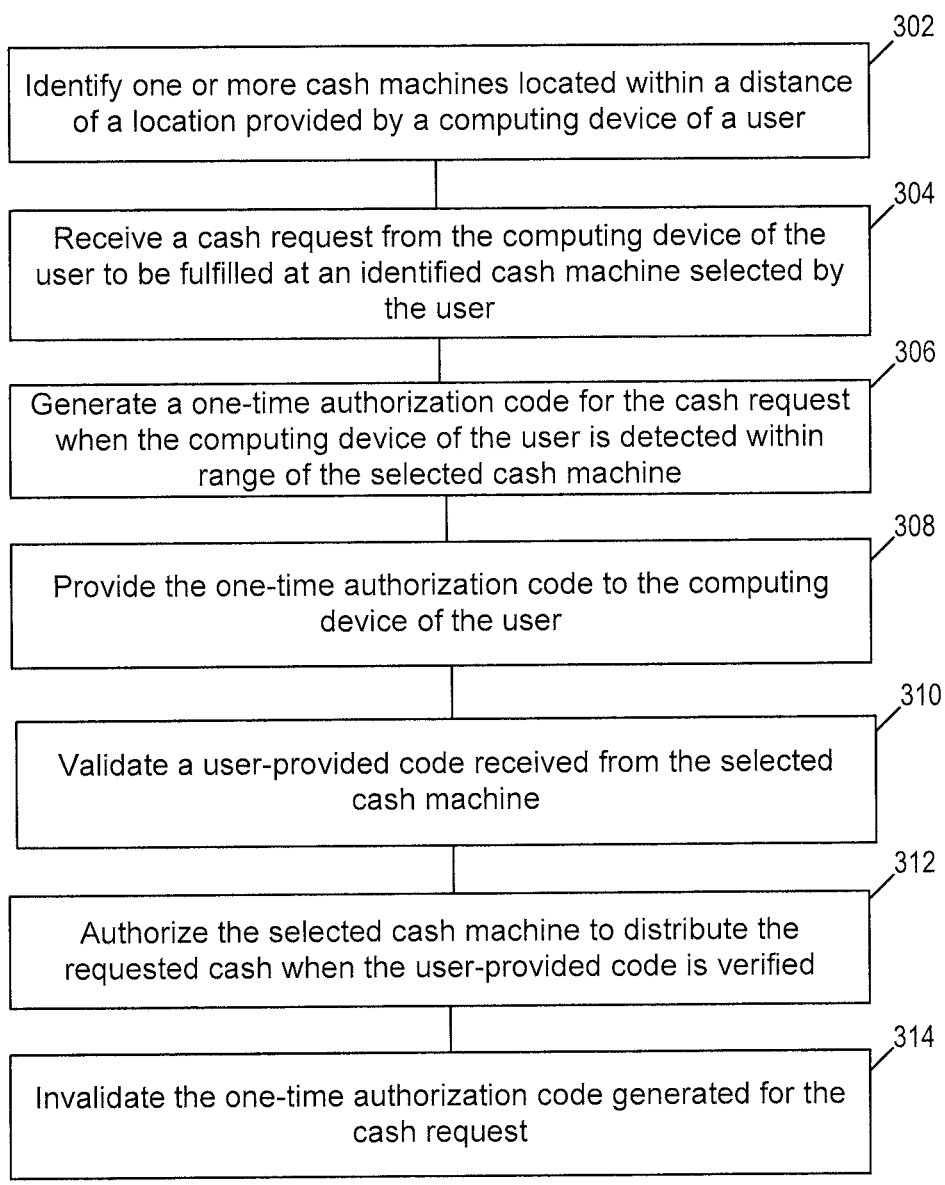
FIG. 3 is a flow diagram illustrating secure cardless cash withdrawal using a cash machine locator, according to an example of the present disclosure.

FIG. 3 is a flow diagram illustrating secure cardless cash withdrawal using a cash machine locator, according to an example of the present disclosure. The method 300 may be performed by processing logic that may comprise hardware (circuitry, dedicated logic, programmable logic, microcode, etc.), software (such as instructions run on a general purpose computer system, dedicated machine, or processing device), firmware, or a combination thereof.

Method 300 begins at block 302 cash authorization system 140 identifies one or more cash machines 108A-108N located within a distance of a location provided by a computing device of a user 102A. In an example, cash machine locator 150 identifies one or more cash machines 108A-108N near a user-provided location or a location provided by a computing device of a user 102A (e.g., via global positioning system(s) (GPS), accelerometer(s), gyroscope(s), location image recognition, a beacon network, etc.). For example, a user 102A may search for one or more nearby cash machines 108A-108N prior to or as part of initiating a cardless cash request. In one example, cash machine locator 150 filters identified cash machines based on one or more user preferences (e.g., preferred financial institution 106A, cash machine service fees, preferred currency or currencies, merchant affiliation, cardless cash withdrawal service availability, etc.).

In an example, cash machine locator 150 provides information about one or more identified cash machines 108A-108N to a user 102A. In one example, cash machine locator 150 provides a user 102A with a location of a closest available cash machine 108A in relation to a plurality of identified cash machines 108A-108N. Cash machine locator 150 also may provide a user 102A with a visual or textual indication that an identified cash machine 108A supports cardless financial transactions. In one example, cash machine locator 150 receives an indication that a user 102A has selected an identified cash machine 108A for a cardless cash withdrawal request or other transaction type.

At block 304, cash authorization system 140 receives a cash request from the computing device of the user 102A to be fulfilled at an identified cash machine 108A selected by the user 102A. In an example, cash request manager 160 receives a cash request from a user 102A comprising one or more of a user-selected cash machine 108A to fulfill the cash request, a financial institution 106A account to serve as a funding source for the cash request, a requested cash amount, a currency for the requested cash, etc. In one example, cash request manager 160 requests and receives authorization for the cash request from a financial institution 106A. Cash request manager 160 also may authorize the cash request based on one or more attributes of a user 102 financial account. For example, cash request manager 160 may authorize a cash request when an available amount of funds in a user 102A account equals or exceeds an amount of requested cash.

At block 306, cash authorization system 140 generates a one-time authorization code for the cash request when the computing device of the user 102A is detected within range of the selected cash machine 108A. In an example, cash request manager 160 receives an indication that a beacon 110A associated with a cash machine 108A has detected the presence of a user 102A computing device within range of the cash machine 108A. In one example, cash request manager 160 generates a one-time authorization code for a cash request when a computing device of a user 102A is at a user-selected cash machine. For example, cash request manager 160 may generate a one-time authorization code for a cash request when a user 102A computing device is detected fewer than twelve inches away from a cash machine 108A as indicated by a beacon 110A. In one example, beacons 110A-110N may communicate with a client and/or server based cash authorization system 140 via an application on a mobile computing device of a user 102A.

In an example, a software application on a computing device prompts a user 102A to approach a cash machine 108A. For example, a software application on a user 102A computing device communicates with a cash machine 108 beacon 110A and receives or determines a user's 102A location in relation to the cash machine 108. In one example, a software application may continually or periodically instruct a user to approach a cash machine 108A until it is determined that the user 102A is close enough to the cash machine 108A to complete a transaction. For example, a user 102A may be prompted to approach a cash machine until a user is detected twelve or fewer inches away from the cash machine 108A, cancels a pending cash request, or is no longer detected in range or the presence of a cash machine 108A.

At block 308, cash authorization system 140 provides the one-time authorization code to the computing device of the user 102A. In an example, cash authorization system 140 provides a one-time authorization code associated with a cash request to a computing device of a user 102A when the computing device is detected within twelve inches of a cash machine 108A. In one example, cash request manager 150 generates and provides a one-time authorization code to the computing device of the user 102A in response to detecting or receiving an indication that the user 102A is within twelve inches of a cash machine 108A.

At block 310, cash authorization system 140 validates a user-provided code received from the selected cash machine 108A. In an example, cash request validator 170 validates a user-provided code received from a cash machine 108A by determining that the user-provided code matches a one-time authorization code associated with a cash request. In addition, cash request validator 170 validation may comprise determining that a one-time authorization code associated with the cash request has not expired, determining that an identity or location of a cash machine 108 associated with the user-provided code corresponds to a cash machine 108A selected by a user 102A, determining that a current location of a user 102A computing device receiving the one-time authorization code corresponds to a selected cash machine 108, or determining that biometric data received from a cash machine matches corresponding biometric data for a user 102A.

At block 312, cash authorization system 140 authorizes the selected cash machine 108A to distribute the requested cash when the user-provided code is verified. In an example, cash request validator 170 sends an instruction authorizing a selected cash machine 108A to fulfill a pending cash request when a user-provided code matches a one-time authorization code generated for the cash request. In one example, cash request validator 170 also may validate one or more additional aspects of a cash request as indicated at block 310 prior to sending authorization to a cash machine.

At block 314, cash authorization system 140 invalidates the one-time authorization code generated for the cash request. In an example, authorization code invalidator 180 invalidates a one-time authorization code associated with a cash request when the cash request is fulfilled by a cash machine 108A or the cash request is canceled. In one example, a cash request may be canceled actively or passively by a user 102A. For example, a user 102A may actively cancel a pending cash request using a function provided by an application on a computing device or a function provided by a cash machine 108A. A user 102A may passively cancel a pending cash request when a computing device associated with the pending cash request moves away and/or outside of range of a cash machine 108A as indicated by a beacon 110A.

Figure 4:
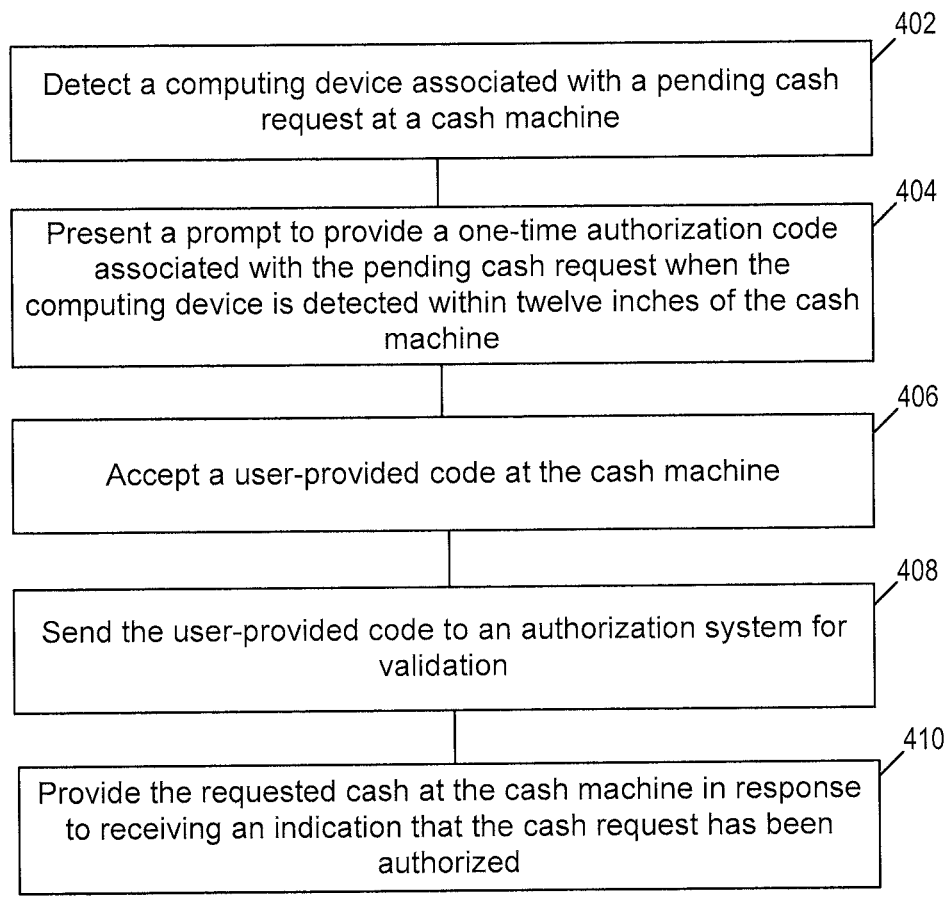
FIG. 4 is a flow diagram illustrating secure cardless cash withdrawal at a cash machine, according to an example of the present disclosure.

FIG. 4 is a flow diagram illustrating secure cardless cash withdrawal at a cash machine, according to an example of the present disclosure. The method 400 may be performed by processing logic that may comprise hardware (circuitry, dedicated logic, programmable logic, microcode, etc.), software (such as instructions run on a general purpose computer system, dedicated machine, or processing device), firmware, or a combination thereof.

Method 400 begins at block 402 when a cash machine 108A detects a computing device associated with a pending cash request. In an example, a beacon 110A associated with a cash machine 108A detects the presence of a user 102A computing device associated with a pending cash request. In one example, an application on a user 102A computing device interacts with a beacon 110A and continually or periodically prompts a user 102A to approach the cash machine 108A until the user 102A computing device is detected within twelve inches of the cash machine 108A.

In an example, an application on a user 102A computing device interacts with a beacon 110A of a cash machine 108A and a cash authorization system 140. In one example, a mobile device application indicates to cash request manager 160 that a user 102A is within twelve inches of the cash machine 108A. In response, cash request manager 160 generates and provides a one-time authorization code for authorizing the cash request to a user 102A computing device, for example, via a 3G, 4G, wireless or other network.

In general, a beacon 110A may detect the presence of a computing device, detect that a computing device has an application configured to communicate with the beacon, request and receive a user phone number or account identifier, and receive details associated with a user 102A account.

At block 404, the cash machine 108A requests a one-time authorization code associated with the pending cash request when the computing device is detected within twelve inches of the cash machine 108A. In an example, a cash machine 108A prompts a user 102A to enter a one-time authorization code for a pending cash request. For example, a cash machine 108A may display a prompt and an input field when a user 102A is detected within twelve inches as indicated by a beacon 110A. In one example, a cash machine 108A may prompt a user to provide a quick response (QR) code, bar code, or other readable image at a scanning input sensor associated with the cash machine 108A. In some examples, a cash machine 108A also may prompt a user 102A for biometric information, such as a fingerprint, hand or palm print, facial scan, eye scan, voice sample, writing sample, etc. In a further example, a beaconless cash machine 108A may provide a standard selectable screen accessible to any user that allows direct input of a one-time authorization code at the cash machine.

At block 406, the cash machine 108A accepts a user-provided code in response to the request for a one-time authorization code. In an example, a cash machine 108A accepts a user-provided code (e.g., numeric, alphanumeric, quick response, barcode, etc.) to authenticate a pending cash request at the cash machine 108A. A user 102A may directly enter a user-provided code using an input device associated with a cash machine. A user 102A also may allow a cash machine 108A to scan a visual code displayed on a computing device of the user 102A. Further, a client 102A also may provide a sampling of biometric data to a cash machine 108A in addition to a one-time authorization code.

At block 408, the cash machine 108A sends the user provided code to an authorization system for validation. In an example, cash machine 108A sends a user provided code to cash request validator 170 for validation. Cash machine 108A also may send additional information to allow cash request validator 170 to validate a cash request. For example, a cash machine 108A may send its identity, location and other attributes to cash request validator 170. A cash machine 108A also may send biometric data collected from a user 102A to cash request validator 170 for additional validation.

At block 410, the cash machine 108A provides the requested cash in response to receiving an indication that the cash request has been authorized. In an example, cash machine 108A receives an authorization message from cash request validator 170 indicating that a pending cash request has been validated and is authorized. In response, cash machine 108A dispenses the requested cash to a user 102A, reports completion of the cash request to cash request manager 160, and authorization code invalidator 180 deactivates the one-time authorization code generated for the completed cash request.

Figure 5:
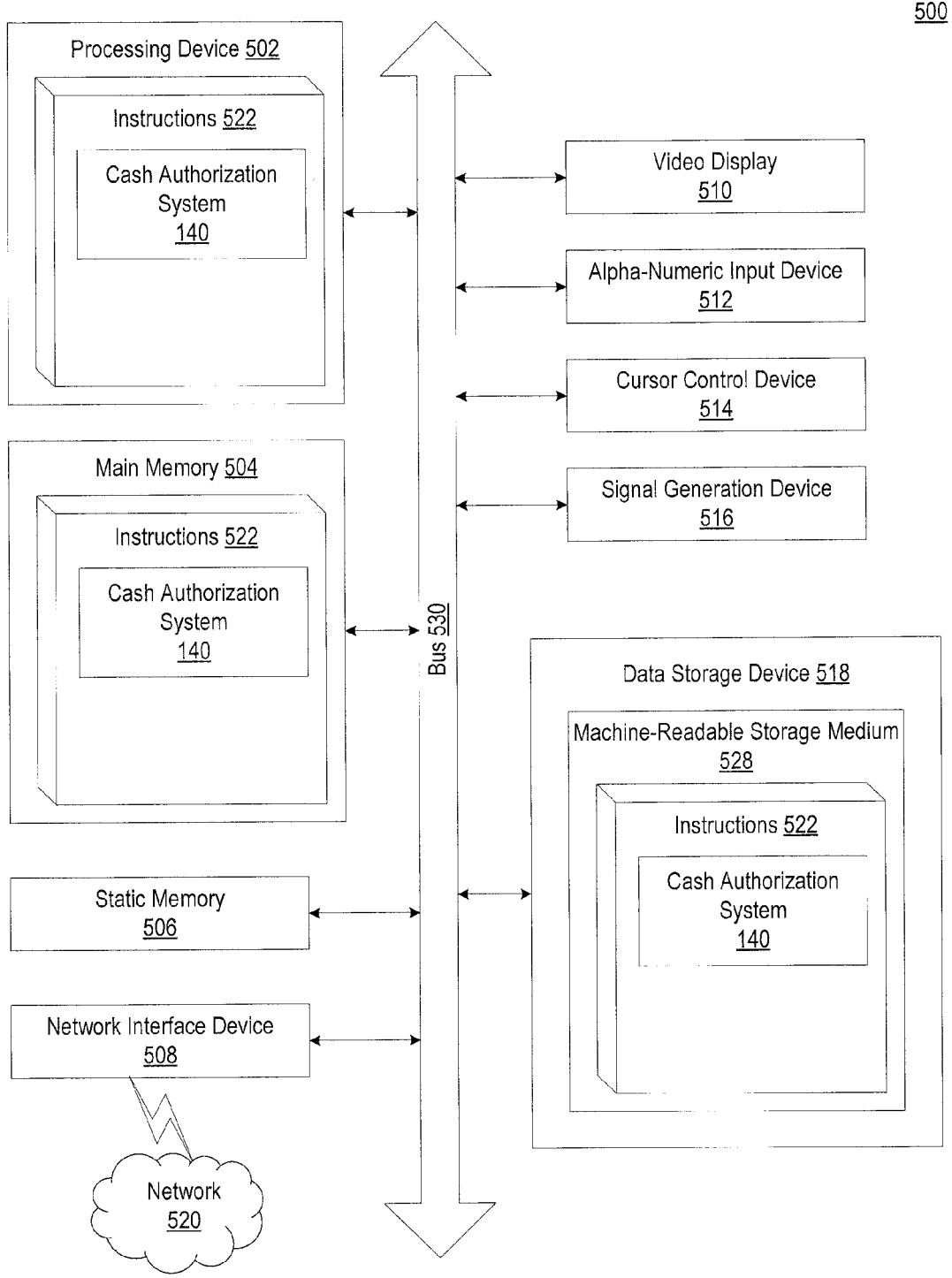
FIG. 5 is a block diagram of an exemplary computer system that may perform one or more of the operations described herein.

FIG. 5 illustrates a diagram of a machine in the exemplary form of a computer system 500 within which a set of instructions, for causing the machine to perform any one or more of the methodologies discussed herein, may be executed. In an example, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device (processor) 502, a main memory 504 (e.g., read-only memory (ROM), flash memory, dynamic random access memory (DRAM) such as synchronous DRAM (SDRAM), double data rate (DDR SDRAM), or DRAM (RDRAM), etc.), a static memory 506 (e.g., flash memory, static random access memory (SRAM), etc.), and a data storage device 518, which communicate with each other via a bus 530.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The processor 502 is configured to execute instructions 522 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a computer-readable storage medium 528 on which is stored one or more sets of instructions 522 (e.g., software) embodying any one or more of the methodologies or functions described herein. The instructions 522 may also reside, completely or at least partially, within the main memory 504 and/or within the processor 502 during execution thereof by the computer system 500, the main memory 504 and the processor 502 also constituting computer-readable storage media. The instructions 522 may further be transmitted or received over a network 520 via the network interface device 508.

In one example, the instructions 522 include instructions for a cash authorization system (e.g., cash authorization system 140 of FIG. 1) and/or a software library containing methods that call a cash authorization system. While the computer-readable storage medium 528 (machine-readable storage medium) is shown in an example to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "computing", "comparing", "applying", "creating", "ranking," "classifying," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Certain examples of the present disclosure also relate to an apparatus for performing the operations herein. This apparatus may be constructed for the intended purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Many other examples will be apparent to those of skill in the art upon reading and understanding the above description. The scope of the disclosure should, therefore, be determined with reference to the appended claims, along with the full scope of equivalents to which such claims are entitled.

What is claimed is:

1. A computer system, comprising:
a non-transitory memory storing instructions; and
one or more hardware processors coupled to the non-transitory memory and configured to read the instructions from the non-transitory memory to cause the computer system to perform operations comprising:
receiving a cash request from a computing device of a user;
generating a one-time authorization code for the cash request;
providing the one-time authorization code to each of a plurality of cash machines allowing any one of the plurality of cash machines to process the cash request;
receiving an indication that the computing device is detected by one or more sensors associated with a first cash machine from the plurality of cash machines;
notifying the user, via the computing device, to approach the first cash machine based on the indication and determining that the computing device is located beyond a transactional distance from the first cash machine; and
processing the cash request when a user-provided code received at the first cash machine matches the one-time authorization code.

2. The computer system of claim 1, wherein the operations further comprise:
providing the one-time authorization code to the computing device of the user when the computing device is detected by the one or more sensors associated with the first cash machine.

3. The computer system of claim 2, wherein the one-time authorization code is generated based on the indication that the computing device is detected by the one or more of the sensors associated with the first cash machine.

4. The computer system of claim 2, wherein the one-time authorization code is provided to the computing device of the user based on determining that the computing device is within twelve inches from the first cash machine as indicated by the one or more sensors associated with the first cash machine.

5. The computer system of claim 1, wherein the operations further comprise:
providing the one-time authorization code to a second computing device associated with a different user.

6. The computer system of claim 5, wherein the second user is indicated in the cash request.

7. The computer system of claim 1, wherein the operations further comprise:
receiving biometric data collected from the user at the first cash machine.

8. The computer system of claim 1, wherein the operations further comprise:
associating the one-time authorization code with the cash request.

9. The computer system of claim 1, wherein the operations further comprise:
invalidating the one-time authorization code generated for the cash request.

10. The computer system of claim 1, wherein the one-time authorization code is a single-use personal identification number (PIN).

11. The computer system of claim 1, wherein the one-time authorization code is a single-use quick response (QR) code.

12. The computer system of claim 1, wherein the operations further comprise:
approving the cash request based on one or more attributes of a financial account associated with the user.

13. The computer system of claim 1, wherein the operations further comprise:
providing a respective location of each one of the plurality of cash machines to the computing device.

14. The computer system of claim 1, wherein the operations further comprise:

providing, to the computing device, an indication that one or more of the plurality of cash machines allow cardless cash withdrawals.

15. The computer system of claim 1, wherein the operations further comprise:
providing, to the computing device, a listing of one or more cardless cash machines among the plurality of cash machines based on at least one user preference.

16. The computer system of claim 1, wherein the operations further comprise:
receiving an indication that the user has selected the first cash machine to fulfill the cash request.

17. The computer system of claim 1, wherein the operations further comprise:
validating the user-provided code received at the first cash machine by:
determining that the one-time authorization code is active;
verifying a location of the first cash machine; and
comparing the user-provided code to the one-time authorization code.

18. The computer system of claim 1, wherein each of the cash machines authorized to process the cash request is associated with a common beacon network.

19. A computer-implemented method, comprising:
receiving, by one or more processor devices, a cash request from a computing device of a user;
generating, by one or more of the processor devices, a one-time authorization code for the cash request;
providing, by one or more of the processor devices, the one-time authorization code to each of a plurality of cash machines allowing any one of the plurality of cash machines to process the cash request;
receiving an indication that the computing device is detected by one or more sensors associated with a first cash machine in the plurality of cash machines;
transmitting, by one or more of the processor devices, the one-time authorization code to the computing device of the user based on the indication;
notifying the user to approach the first cash machine based on the indication and determining that the computing device is located beyond a transactional distance from the first cash machine; and
authorizing, by one of more the processor devices, the first cash machine to process the cash request when a user-provided code received at the first cash machine matches the one-time authorization code.

20. A non-transitory machine-readable medium having stored thereon machine-readable instructions executable to cause a machine to perform operations comprising:
receiving a cash request from a computing device of a user;
generating a one-time authorization code for the cash request;
providing the one-time authorization code to each of a plurality of cash machines allowing any one of the plurality of cash machines to process the cash request;
receiving an indication that the computing device is detected by one or more sensors associated with a first cash machine from the plurality of cash machines;
notifying the user to approach the first cash machine based on the indication and determining that the computing device is located beyond a transactional distance from the first cash machine; and
processing the cash request when a user-provided code received at the first cash machine matches the one-time authorization code.

* * * * *